US012724573B2

(12) United States Patent
Suzuki

(10) Patent No.: US 12,724,573 B2
(45) Date of Patent: Sep. 1, 2026

(54) PRINTING APPARATUS, METHOD OF CONTROLLING PRINTING APPARATUS, AND STORAGE MEDIUM

(71) Applicant: CANON KABUSHIKI KAISHA, Tokyo (JP)

(72) Inventor: Takeshi Suzuki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 305 days.

(21) Appl. No.: 18/421,023

(22) Filed: Jan. 24, 2024

(65) Prior Publication Data

US 2024/0289064 A1 Aug. 29, 2024

(30) Foreign Application Priority Data

Feb. 28, 2023 (JP) ................................ 2023-029234

(51) Int. Cl.

| | |
|---|---|
| ***H04N 1/04*** | (2006.01) |
| ***B41J 2/175*** | (2006.01) |
| ***G06F 3/12*** | (2006.01) |
| ***G06K 15/00*** | (2006.01) |

(52) U.S. Cl.

CPC .......... *G06F 3/121* (2013.01); *B41J 2/17566* (2013.01); *G06F 3/1235* (2013.01); *G06F 3/1285* (2013.01); *G06K 15/4075* (2013.01)

(58) Field of Classification Search

None

See application file for complete search history.

(56) References Cited

U.S. PATENT DOCUMENTS

2007/0257954 A1* 11/2007 Nishizaka ............ B41J 2/17509 347/14
2017/0282586 A1* 10/2017 Sasaki ...................... B41J 2/175
2019/0030934 A1* 1/2019 Arakane .............. B41J 2/17546
2025/0326232 A1* 10/2025 Fukata .............. G06Q 30/0601

FOREIGN PATENT DOCUMENTS

JP 2008-102606 A 5/2008

* cited by examiner

*Primary Examiner* — Cheukfan Lee
(74) *Attorney, Agent, or Firm* — VENABLE LLP

(57) ABSTRACT

A printing apparatus having a container with a plurality of containers containing printing materials of the same color type, includes an obtainment unit that obtains a request of information related to a state of the printing apparatus; and a transmission unit that transmits the information related to a state of the printing apparatus including first information related to a combined amount of the printing materials included in the plurality of containers containing the printing materials of the same color type, respectively, based on the request obtained by the obtainment unit.

16 Claims, 9 Drawing Sheets

```
<?xml version= "1.0" encoding= "utf-8" ?>
<cmd xmlns:vender=http://www.vender.com/ns/cmd/common>
        <vender:contents>
   401 ~ <vender:operation>GetPrinterStatus </vender:operation>
            <vender:param_set servicetype= "print" >
            </vender:param_set>
   402 ~ <vender:param_set inktype= "COMBINED" >
            </vender:param_set>
        </vender:contents>
</cmd>
```

FIG.4

```
<?xml version= "1.0" encoding= "utf-8" ?>
<cmd xmlns:vender=http://www.vender.com/ns/cmd/common>
    <vender:contents>
600     <vender:operation>GetPrinterStatusResponse </vender:operation>
601     <vender:status>idle</vender:status>
        <vender:ink>
610         <vender:color>C
611             <NUMBER>2</NUMBER>
612             <WHAT NUMBER OF INK IS IN USE>1</>
613             <COMBINED INK STATUS>none</>
614             <FIRST REMAINING AMOUNT>70</ >
                <SECOND REMAINING AMOUNT>100</ >
615             <FIRST INK STATUS>none</ >
                <SECOND INK STATUS>none</ >
616             <INFORMATION INDICATING PLACE OF INK TANK TO BE REPLACED>none</ >
            </vender:color>
                .
                .
620         <vender:color>M
621             <NUMBER>2</NUMBER>
622             <WHAT NUMBER OF INK IS IN USE>2</>
623             <COMBINED INK STATUS>warning</>
624             <FIRST REMAINING AMOUNT>0</ >
                <SECOND REMAINING AMOUNT>30</ >
625             <FIRST INK STATUS>error</ >
                <SECOND INK STATUS>none</ >
626             <INFORMATION INDICATING PLACE OF INK TANK TO BE REPLACED>http://XXX.YYY1.html</ >
            </vender:color>
        </vender:ink>
    </vender:contents>
</cmd>
```

FIG.6

```
<?xml version= "1.0" encoding= "utf-8" ?>
<cmd xmlns:vender=http://www.vender.com/ns/cmd/common>
    <vender:contents>
700     <vender:operation>GetPrinterStatusResponse </vender:operation>
701     <vender:status>idle</vender:status>
        <vender:ink>
710         <vender:color>C
711             <INK STATUS>none</ >
712             <REMAINING AMOUNT>85</ >
713             <INFORMATION INDICATING PLACE OF INK TANK TO BE REPLACED>none</ >
            </vender:color>
                .
                .
720         <vender:color>M
721             <INK STATUS>warning</ >
722             <REMAINING AMOUNT>15</ >
723             <INFORMATION INDICATING PLACE OF INK TANK TO BE REPLACED>http://XXX.YYY1.html</ >
            </vender:color>
        </vender:ink>
    </vender:contents>
</cmd>
```

FIG.7

PRINTING APPARATUS, METHOD OF CONTROLLING PRINTING APPARATUS, AND STORAGE MEDIUM

BACKGROUND

Field

The present disclosure relates to a printing apparatus, a method of controlling the printing apparatus, and a storage medium.

Description of the Related Art

Conventionally, in a case where a terminal apparatus (for example, a PC) and a printing apparatus are connected to each other to use a printing function of the printing apparatus from the terminal apparatus, it has been necessary to install a driver of the printing apparatus corresponding to an OS operating on the terminal apparatus. The installation of the driver has allowed for the execution of printing by the printing apparatus from an application operating on the terminal apparatus by way of the driver of the printing apparatus.

Additionally, in recent years, the number of printing apparatuses in which multiple containers (for example, ink tanks) capable of containing printing materials (for example, inks) of the same color type are mounted has been increased. Even in a case where one ink tank runs out of ink, the mounting of the multiple ink tanks of the same color type makes it possible to continue printing by using another ink tank of the same color type. Additionally, it is possible to implement the downtime-less printing apparatus by replacing the ink tank out of ink while the printing continues by using the other ink tank of the same color type.

Japanese Patent Laid-Open No. 2008-102606 discloses a function of displaying an ink status using a driver of a printing apparatus operating on a terminal apparatus connected with the printing apparatus to show the user the ink to be used and the ink not to be used in ink tanks of the same color type.

SUMMARY

There has been demanded a technique of further explicitly displaying a status of a container included in a printing apparatus.

A printing apparatus is a printing apparatus including a container that includes a plurality of containers containing printing materials of the same color type, including: an obtainment unit that obtains a request of information related to a state of the printing apparatus; and a transmission unit that transmits the information related to a state of the printing apparatus including first information related to a combined amount of the printing materials included in the plurality of containers containing the printing materials of the same color type, respectively, based on the request obtained by the obtainment unit.

Further features of the present invention will become apparent from the following description of exemplary embodiments with reference to the attached drawings.

BRIEF DESCRIPTION OF THE DRAWINGS

FIG. 4 is an example of a command of a printer status request that is generated by a vendor driver;

FIG. 6 is an example of a command of a printer status response that is generated by the printing apparatus;

FIG. 7 is an example of the command of the printer status response that is generated by the printing apparatus;

DESCRIPTION OF THE EMBODIMENTS

An embodiment of the present disclosure is described in detail by an example with reference to the drawings. Note that, relative arrangement of constituents, a display screen, and the like described in the present embodiment are not intended to be limited thereto.

Embodiment 1

Figure 1:
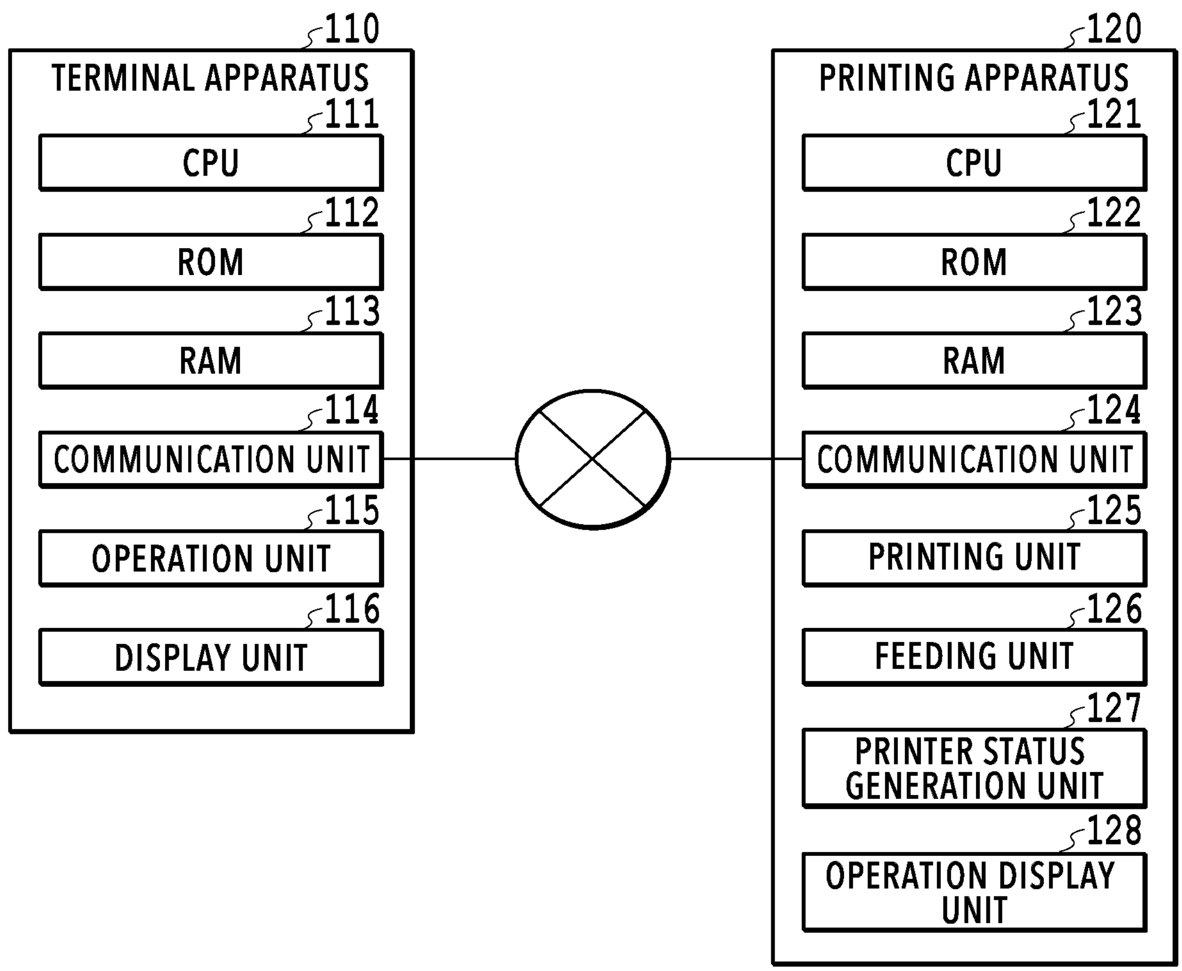
FIG. 1 is a system configuration diagram of a printing system.

FIG. 1 is a system configuration diagram of a printing system in the present embodiment. The present system includes a terminal apparatus 110 that generates a printing job or an obtainment job to obtain information that is required to display a printer status (hereinafter, referred to as status information) and a printing apparatus 120 that consumes the printing job or the status information obtainment job. The terminal apparatus is an information processing apparatus, for example.

The terminal apparatus 110 includes a CPU 111, a ROM 112, a RAM 113, a communication unit 114, an operation unit 115, and a display unit 116. The CPU 111 can generate the printing job or the status information obtainment job and can display printer status information on the printing apparatus 120 by deploying a program stored in the ROM 112 to the RAM 113. A printer status display screen displays the printer status information indicating whether the printer is in a printable state or in an error state, ink status information on each ink tank, or the like. A user inputs setting information required to generate the printing job by using a screen displayed on the display unit 116 and the operation unit 115. The generated printing job is recorded in the RAM 113 and is transmitted to the printing apparatus 120 connected through the communication unit 114.

The connection between the communication unit 114 and the printing apparatus 120 is established by a publicly known method such as the HTTP or the IPP. Likewise, the user inputs setting information required to generate the status information obtainment job by using the screen displayed on the display unit 116 and the operation unit 115. The generated printer status obtainment job is recorded in the RAM 113 and is transmitted to the printing apparatus 120 connected through the communication unit 114. Additionally, the status information is received from the printing apparatus 120 connected through the communication unit 114. The terminal apparatus 110 then performs display control to display a printer status on the display unit 116 based on the received status information. Note that, in the present embodiment, an I/F or the connection form of the communication unit 114 is not particularly prescribed, and it is also possible to transmit and receive data via a wireless LAN, for example. It is possible to apply a personal computer (PC) as the terminal apparatus 110, or various information processing apparatuses such as a smartphone and a digital camera may be applied as the terminal apparatus 110 of the present embodiment.

The printing apparatus 120 includes a CPU 121, a ROM 122, a RAM 123, a communication unit 124, a printing unit 125, a feeding unit 126, a printer status generation unit 127, and an operation display unit 128. The CPU 121 can consume the printing job or the status information obtainment job and can generate the status information by deploying a program stored in the ROM 122 to the RAM 123. The printing apparatus 120 is a printer, for example. A printing method of the printing apparatus 120 used in the present embodiment may be an electrophotographic method, an ink jet method, or another method. Therefore, a printing material in the printing apparatus 120 may be any one of ink, a powder toner, and a liquid toner. A container to contain the printing material may be an ink tank that contains ink, an ink cartridge, or a reservoir into which ink is injected (filled), or a toner cartridge or a toner bottle that contains toner.

It is possible to obtain setting information required to consume the printing job with the CPU 121 analyzing the printing job received through the communication unit 124 according to an analysis program in the ROM (122). According to the setting information required to consume the obtained printing job, the printing apparatus 120 determines media to be printed and obtains the media from the feeding unit 126, and the printing unit 125 executes printing processing. A configuration of a head and ink in a case of including multiple ink tanks of the same color type (colors of the same group) in the execution of the printing processing is described later with reference to FIG. 2.

As with the setting information required to consume the printing job, it is possible to obtain setting information required to consume the status information obtainment job with the CPU 121 analyzing the status information obtainment job received through the communication unit 124 according to the analysis program in the ROM 122. According to the setting information required to consume the status information obtainment job, the printing apparatus 120 transmits the printer status generated by the printer status generation unit 127 to the terminal apparatus 110 through the communication unit 124. Additionally, the printer status generation unit 127 refers to the printer state, which is saved in the RAM 123 and indicates whether the printer is printable or in the error state, or the ink tank information, which is saved in the RAM 123 and is information on each ink tank, and generates the status information including each type of information. The generated status information is displayed on the operation display unit 128 or transmitted to the terminal apparatus 110 as a response in a case where the status information obtainment job is received from the terminal apparatus 110. The status information (or the ink tank information) may be in the form of being periodically generated and saved in the RAM 123 or in the form of being generated once there is a change in the ink status. A flow of processing to respond the generated status information to the terminal apparatus 110 after the printing apparatus 120 obtains the status information obtainment job is described later with reference to FIG. 3.

Note that, the communication method used to connect the apparatuses in the printing system illustrated in FIG. 1 may be a communication standard of IEEE 802.11 series (Wi-Fi), for example. Additionally, the communication method may be Bluetooth (Bluetooth Classic, Bluetooth Low Energy (BLE), and so on). Note that, a mode in which the printing apparatus 120 and the terminal apparatus 110 are not directly connected in the printing system of the present embodiment may be applicable. Specifically, for example, each apparatus is connected with a wireless LAN router via Wi-Fi, and the apparatuses are communicable with each other via the Internet communication using the wireless LAN router. Additionally, the apparatuses may communicate with each other via the mobile communication (3G, 4G, and 5G). Moreover, wired connection using a USB cable and a wired cable may be applicable.

Figure 2:
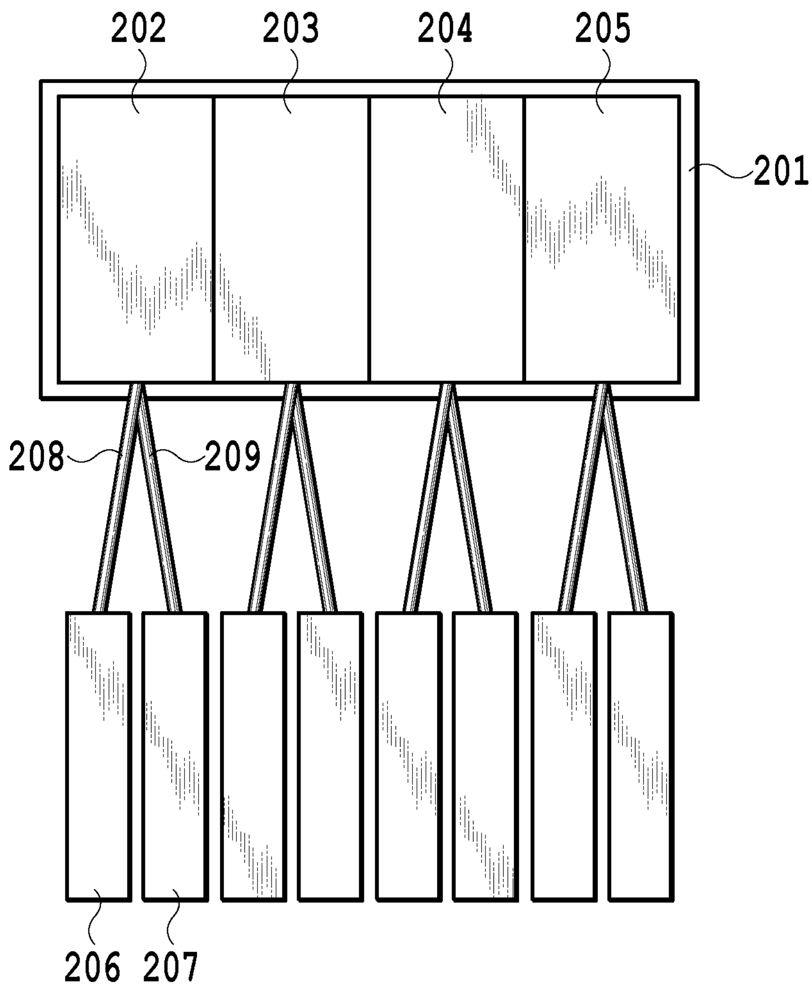
FIG. 2 is a simple connection diagram of a printing head and an ink tank in a printing apparatus.

FIG. 2 is a diagram illustrating a configuration example of simple connection between the printing head and the ink tank in the printing apparatus of the present embodiment. A printing head 201 includes a Bk (black) head 202, a C (cyan) head 203, an M (magenta) head 204, and a Y (yellow) head 205. Additionally, the Bk (black) head 202 is connected to two ink tanks, a Bk (black) ink tank 206 and a Bk (black) ink tank 207, by tubes 208 and 209 for respective supply. The same applies to the heads and ink tanks of the other colors. With such a configuration, the Bk (black) head 202 has a configuration that allows for the ink supply from the two ink tanks, the Bk (black) ink tank 206 and the Bk (black) ink tank (207). Additionally, which ink tank to use, the Bk (black) ink tank 206 or the Bk (black) ink tank 207, may be switched by a not-illustrated ink tank switching switch, or the two ink tanks may be used constantly. Moreover, configurations of a supply valve and the like depend on the system. Note that, although an example in which two ink tanks of the same color type are connected to a single head is illustrated in FIG. 2, it is not limited thereto. Three or more multiple ink tanks may be connected to a single head. Additionally, a configuration including both a configuration in which a single ink tank is connected to a single head and a configuration in which two or more multiple ink tanks are connected to a single head may be applicable.

Figure 3:
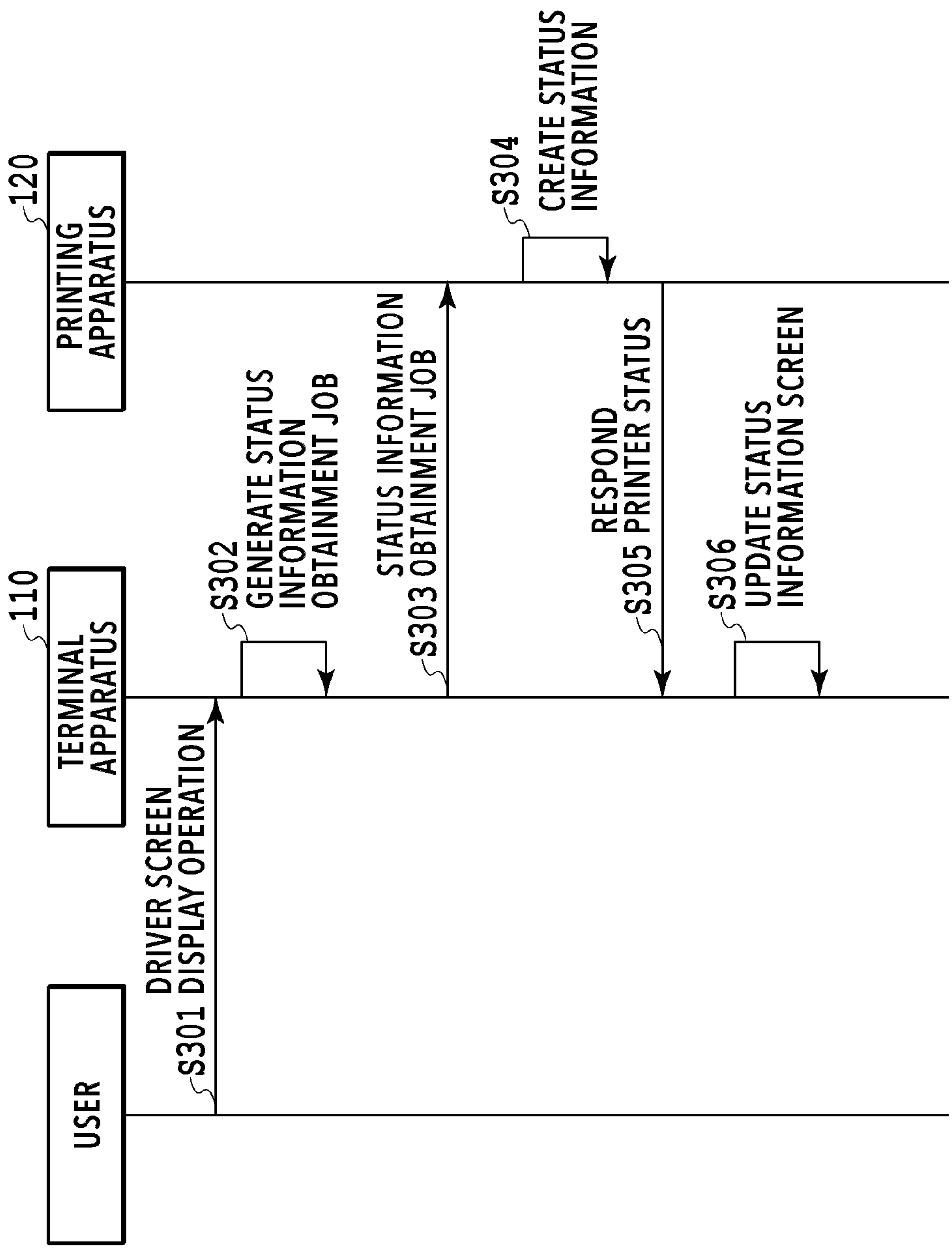
FIG. 3 is a sequence diagram of status information obtainment in the printing system.

FIG. 3 is a sequence diagram illustrating a flow of processing in which the user displays the printer status of the printing apparatus 120 on the display unit 116 of the terminal apparatus 110. The processing of the present sequence is started with the CPU 111 included in the terminal apparatus and the CPU 121 included in the printing apparatus 120 each deploying the program saved in the corresponding ROM to the RAM. In the following description of each processing, "S" means a step in the sequence diagram, and the same applies to the subsequent sequence diagram and flowchart.

First, in S301, the user performs a driver screen display operation to display the printer status on the display unit 116 of the terminal apparatus 110. In the present embodiment, the displaying of the printer status on the screen is implemented by activating a printer driver of the terminal apparatus 110. In S302, the terminal apparatus 110 generates the status information obtainment job to request the printing apparatus 120 the information to form the printer status screen. In S303, the terminal apparatus 110 transmits the generated status information obtainment job to the printing apparatus 120 connected through the communication unit 114. In this process, the printer driver may be either of a unique driver for each vendor and an OS default driver. In a case of the former, a command of a printer status request unique to the vendor is transmitted, and in a case of the latter, for example, a command of Get-Printer-Attributes Request of the IPP, which is a publicly known technique, is transmitted. Details of the command of the printer status request from the vendor driver are described later with reference to FIG. 4.

In S304, the printing apparatus 120 allows the printer status generation unit 127 to generate the status information with reference to the printer state, which is saved in the RAM 123 and indicates whether the printer is printable or in the error state, or the ink information on each ink tank, which is saved in the RAM 123. In S305, the printing apparatus 120 transmits the status information created in S304 to the terminal apparatus 110 as a response. In this process, the printing apparatus 120 generates the status information according to the transmission destination of the status information obtainment job, a parameter of the status information obtainment job, or the state of the printing apparatus 120. Details of the processing flow of the status information generation are described later with reference to FIG. 5.

Additionally, the printing apparatus 120 generates the status information depending on the printer driver of the terminal apparatus 110 that transmits the printer status obtainment job in S303. In the present embodiment, the terminal apparatus includes a printer driver that is either of the unique driver for each vendor and the OS default driver. In a case of the former, the command of the printer status response unique to the vendor is transmitted. On the other hand, in a case of the latter, for example, the command of Get-Printer-Attributes Response of the IPP, which is a publicly known technique, is transmitted. Details of the status information in a case where the printing apparatus 120 generates the information on the ink tank for the vendor driver by combining the ink amounts and a case of generating the information with the individual ink amount of each ink tank without combining the ink amounts are described later with reference to FIGS. 6 and 7, respectively.

In S306, the terminal apparatus 110 passes the status information received in S305 to the printer driver and updates the printer status screen. Thereafter, the processing of the present sequence diagram ends. In S306, the user can check the printer status of the printing apparatus 120 by looking at the display screen. The printer status screens in a case where the ink status displayed on the terminal apparatus 110 is generated in the combined form and in a case where the ink status is generated in the individual form are described later with reference to FIGS. 8 and 9, respectively. The above is the sequence diagram illustrating the flow of the processing of displaying the printer status of the printing apparatus 120 on the display unit 116 of the terminal apparatus 110 in the present embodiment. Note that, an example in which the printing apparatus 120 creates the status information after receiving the status information obtainment job is illustrated in FIG. 3, however, it is not limited thereto. For example, the status information may be created and saved into the RAM 123 once there is a change in the printer status in the printing apparatus 120 or may be periodically created and saved into the RAM 123. Additionally, the status information may be created in a case where there is no status information in the RAM 123.

FIG. 4 is an example of the command of the printer status request generated by the vendor driver of the terminal apparatus 110 in the present embodiment. The command of the printer status request is formed in an XML format. Details are described below.

An operation 401 is a parameter to designate a type of a job and can designate not only "Get Printer Status" meaning the printer status request but also the printing job. Additionally, a parameter 402 is a parameter to designate how to display a status related to the number, the remaining amounts, or the like of the ink tanks and can designate "combined" or "individual".

As described above, the printing apparatus 120 in the present embodiment includes the multiple ink tanks of the same color type. For example, on the display screen of the status displayed by the driver, it is required to arrange, to fit in one screen, sheet information, information indicating whether it is printable, information indicating whether it is in the error state, or other information. Accordingly, it is assumed that it is impossible to secure a display region for individually displaying the information on all the ink tanks on such a display screen.

To deal with this, in a case of displaying the printer status on the display unit 116 based on the obtained status information, the vendor driver of the terminal apparatus 110 of the present embodiment determines whether the display region has a space depending on the setting of the vendor driver. In a case where the display region has a space, "individual" is designated in the parameter 402, and thus the detailed ink remaining amount of each ink tank can be obtained and displayed on the display unit 116. On the other hand, in a case where the display region has no space, "combined" is designated in the parameter 402, and thus the combined ink remaining amounts of each color can be obtained and displayed on the display unit 116. Thus, it is possible to designate the method of displaying the ink status using the parameter 402 according to the form of the ink information that is demanded to be displayed on the display unit 116 by the vendor driver.

Note that, although it is described that "individual" or "combined" is designated depending on whether the display region has a space, it is not limited thereto. Even in a case where the display region has a space, the displaying may be performed with "combined". Additionally, for example, "combined" may be designated in a case of displaying the ink information in a simple manner, and "individual" may be designated in a case of displaying the ink information in a detailed manner. Moreover, the displaying form may be switched depending on what kind of ink information the vendor driver wants to present to the user. Furthermore, the user may manually switch between "individual" and "combined" depending on the setting of the driver.

Figure 5:
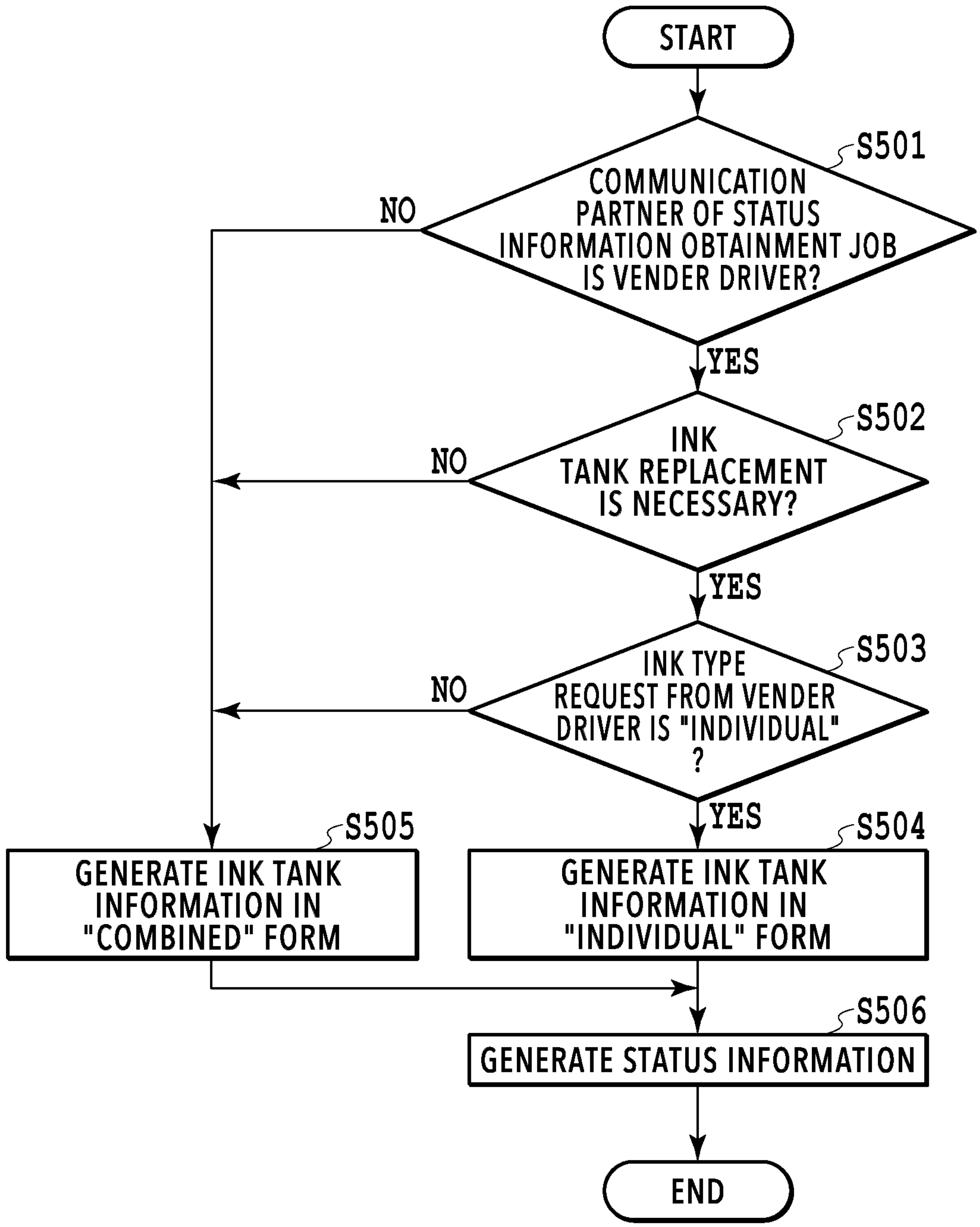
FIG. 5 is a processing flow diagram of generation of the status information.

FIG. 5 is an example of a processing flow by the printing apparatus 120 in the present embodiment in which the printing apparatus 120 generates the status information in S304 in FIG. 3. The processing in the present flowchart is started based on that the printing apparatus 120 receives the status information obtainment job. Additionally, the processing in the present flowchart is based on control by the CPU 121 included in the printing apparatus 120, and the printer status generation unit 127 primarily performs the processing.

In S501, once the status information obtainment job is received, the printer status generation unit 127 of the printing apparatus 120 determines whether the communication partner of the status information obtainment job is the vendor driver. Specifically, the printer status generation unit 127 determines a communication protocol in the connection between the terminal apparatus 110 and the printing apparatus 120 based on a port number used for the communication. For example, in a case where the port number is 631, since it is the connection with the IPP, it is determined that the communication partner is the OS default driver, and in a case where the port number is other than 631, since it is the connection with a method other than the IPP, it is determined that the communication partner is the vendor driver. In S501, if the printer status generation unit 127 determines as YES, the printer status generation unit 127 proceeds to S502. On the other hand, if the printer status generation unit 127 determines as NO, the printer status generation unit 127 proceeds to S505.

In S502, the printer status generation unit 127 determines whether it is a state that needs replacement of the ink tank. Specifically, it is determined whether there is at least one ink tank with an ink remaining amount equal to or smaller than a predetermined threshold (for example, 10%). If the printer status generation unit 127 determines as YES (ink tank replacement is necessary) in S502, the printer status generation unit 127 proceeds to S503. On the other hand, if the printer status generation unit 127 determines as NO (ink tank replacement is unnecessary), the printer status generation unit 127 proceeds to S505. That is, in a case where the ink tank replacement is necessary, the determination processing in the present step makes it possible to appropriately notify the user of the ink tank that needs to be replaced even if there are multiple ink tanks of the same color type included. Additionally, since it is determined that the ink tank replacement is unnecessary in a case where there is no ink tank equal to or smaller than the predetermined threshold, it is unnecessary to transmit the information on the individual ink tank to the terminal apparatus 110. Note that, instead of depending on whether there is at least one ink tank with an ink remaining amount equal to or smaller than the predetermined threshold, the present determination may be depending on whether there is at least one ink tank with a remaining amount equal to or smaller than the predetermined threshold out of multiple ink tanks containing the same color type of inks. That is, in a case where a configuration in which there is a single ink tank containing a predetermined color of ink is included, even if it is determined that the ink remaining amount of the single ink tank is equal to or smaller than the predetermined threshold, it may not affect the present determination, and it may be determined as NO.

In S503, the printer status generation unit 127 determines whether the designation of the ink type in the parameter 402 by the vendor driver is "individual" in the command of the printer status request described in FIG. 4. Specifically, it is determined whether the ink tank information (a character string of ink type designated by <vender:param_set inktype="XX">) included in the command of the printer status request matches "combined" or "individual". If the printer status generation unit 127 determines as YES (the character string of ink type is "individual") in S503, the printer status generation unit 127 proceeds to S504. On the other hand, if the printer status generation unit 127 determines as NO (the character string of ink type is "combined") in S503, the printer status generation unit 127 proceeds to S505.

In S504, the printer status generation unit 127 generates the ink tank information included in the status information in the individual form. In S505, the printer status generation unit 127 generates the ink tank information included in the status information in the combined form.

In S506, the printer status generation unit 127 generates the status information by combining the printer state, which is saved in the RAM (123) and indicates whether the printer is printable or in the error state, and the ink tank information generated in S504 or S505. Thereafter, the printer status generation unit 127 ends the processing in the present flowchart. The above is the flow of the processing of generating the status information by the printing apparatus 120.

Note that, in FIG. 5, although whether to generate the multiple pieces of the ink tank information or to generate the combined ink tank information is determined by determining the conditions in S502 or S503, it is not limited thereto. There may be the determination processing in either one of S502 and S503 or may be none of both the types of the determination processing.

Additionally, although it is assumed in the processing in FIG. 5 that the processing is performed on the ink tanks of all the colors included in the printing apparatus 120, for example, a mode in which only the corresponding ink tank information is generated in a case where there is the ink tank with the remaining amount of the ink tank equal to or smaller than the predetermined threshold may be applicable. In this case, if there are multiple ink tanks equal to or smaller than the predetermined threshold, the ink tank information on the corresponding multiple ink tanks may be generated.

FIG. 6 is an example of the command of the printer status response in a case where the printing apparatus 120 in the present embodiment generates multiple pieces of ink tank information of the same color type for the vendor driver in the individual form. The command of the printer status response is formed with XML, and an operation 600, which is "Get Printer Status Response", is generated for the terminal apparatus 110. Additionally, contents such as a status 601, which is "idle", or pieces of ink tank information 610 and 620 are included. The status 601 is a parameter designating the state of the printer, and in addition to "idle" meaning it is printable, for example, a status such as "busy" meaning that other processing is being carried out or "error" meaning that the printer is in a no-sheet error state and cannot perform printing is generated. The ink tank information 610 is information related to the ink tank of the C (cyan) color and formed of number information 611 to information 616 indicating the place of the ink tank to be replaced.

The number information 611 generates that there are two ink tanks of the C (cyan) color. Additionally, in-use ink information 612 generates a value indicating that the first one of the two ink tanks of the C (cyan) color is in use. Subsequently, combined ink status 613 generates "none" indicating that there is no particular problem in the ink status of the two ink tanks of the C (cyan) color. In a case where there is a problem, "warning" or "error" is generated. Additionally, ink remaining amount 614 generates a value indicating that the ink remaining amount of the first ink tank of the two ink tanks of the C (cyan) color is 70% and the ink remaining amount of the second ink tank thereof is 100%. It can be seen that the remaining amount of the first ink tank is decreased since the in-use ink information 612 indicates that the first ink tank is in use. Additionally, since there remains sufficiently the ink for printing in both the two ink tanks, the combined ink status 613 generates "none". Subsequently, ink status 615 generates "none" indicating that there is no particular problem in each ink status of the two ink tanks of the C (cyan) color.

Finally, since the remaining amounts of the two ink tanks of the C (cyan) color are sufficient, the information 616 indicating the place of the ink tank to be replaced generates "none" indicating that there is no particular information indicating the place of the ink tank to be replaced. Subsequently, the ink tank information 620 is information related to the ink tank of the M magenta color and is formed of number information 621 to information 626 indicating the place of the ink tank to be replaced. The number information 621 generates that there are two ink tanks of the M (magenta) color. Additionally, in-use ink information 622 generates a value indicating that the second one of the two ink tanks of the M (magenta) color is in use. Subsequently, combined ink status 623 generates "warning" since the remaining amount of the two ink tanks of the M (magenta) color is low. Additionally, ink remaining amount 624 generates a value indicating that the ink remaining amount of the first ink tank is 0%, and the ink remaining amount of the second ink tank is 30%. Subsequently, since the first ink tank is 0%, ink status 625 generates "error" indicating that it is in an error state. Finally, since the first ink tank of the M (magenta) color needs to be replaced, the information 626 indicating the place of the ink tank to be replaced generates URL of information indicating a replacement procedure to the user as information indicating the place of the ink tank to be replaced.

With the user clicking this URL on the driver, it is possible to open a page describing the ink replacement method on a browser and the like by the terminal apparatus 110. In the printing apparatus 120 compatible with multiple ink tanks for different colors, since it is possible to mount many ink tanks in the printing apparatus 120, it is more difficult to replace the ink tank than a conventional printer. Therefore, it is possible to encourage the user to easily replace the ink tank by adding the information indicating the place of the ink tank to be replaced. Note that, although the pieces of ink tank information 610 and 620 on the two colors, cyan and magenta, are described as an example in FIG. 6, it is not limited to two colors. The ink status of each color is generated similarly in a case of dealing with much more colors.

FIG. 7 is an example of the command of the printer status response in a case where the printing apparatus 120 in the present embodiment generates multiple pieces of ink tank information of the same color type for the vendor driver in the combined from. An operation 700 and a status 701 are similar to the operation 600 and the status 601, respectively; for this reason, descriptions are omitted. Ink tank information 710 is information related to the ink tank of the C (cyan) color and is formed of ink status 711 to information 713 indicating the place of the ink tank to be replaced. The ink status 711 and the information 713 indicating the place of the ink tank to be replaced are similar to the combined ink status 613 and information 616 indicating the place of the ink tank to be replaced; for this reason, descriptions are omitted. Ink remaining amount 712 generates a value indicating a combined remaining amount of the remaining amounts of the two ink tanks of the C (cyan) color. As indicated by the ink remaining amount 614, since the first ink tank is 70%, and the second ink tank is 100%, the combined remaining amount is 85%. Subsequently, ink tank information 720 is information related to the ink tank of the M (magenta) color and formed of ink status 721 to information 723 indicating the place of the ink tank to be replaced. The ink status 721 and the information 723 indicating the place of the ink tank to be replaced are similar to the combined ink status 623 and the information 626 indicating the place of the ink tank to be replaced; for this reason, the descriptions are omitted. Ink remaining amount 722 generates a value indicating a combined remaining amount of the remaining amounts of the two ink tanks of the M (magenta) color. As indicated by the ink remaining amount 624, since the first ink tank is 0%, and the second ink tank is 30%, the combined remaining amount is 15%.

Additionally, although a case of the vendor driver is described above, it is not limited to the above in a case of the OS default driver. In a case of the OS default driver, in general, the information on the ink status 711 or the ink remaining amount 712 is also prepared; however, in some cases, uncommon information such as the information 713 indicating the place of the ink tank to be replaced is not defined as a response parameter. In this case, only the defined information is responded.

Figure 8:
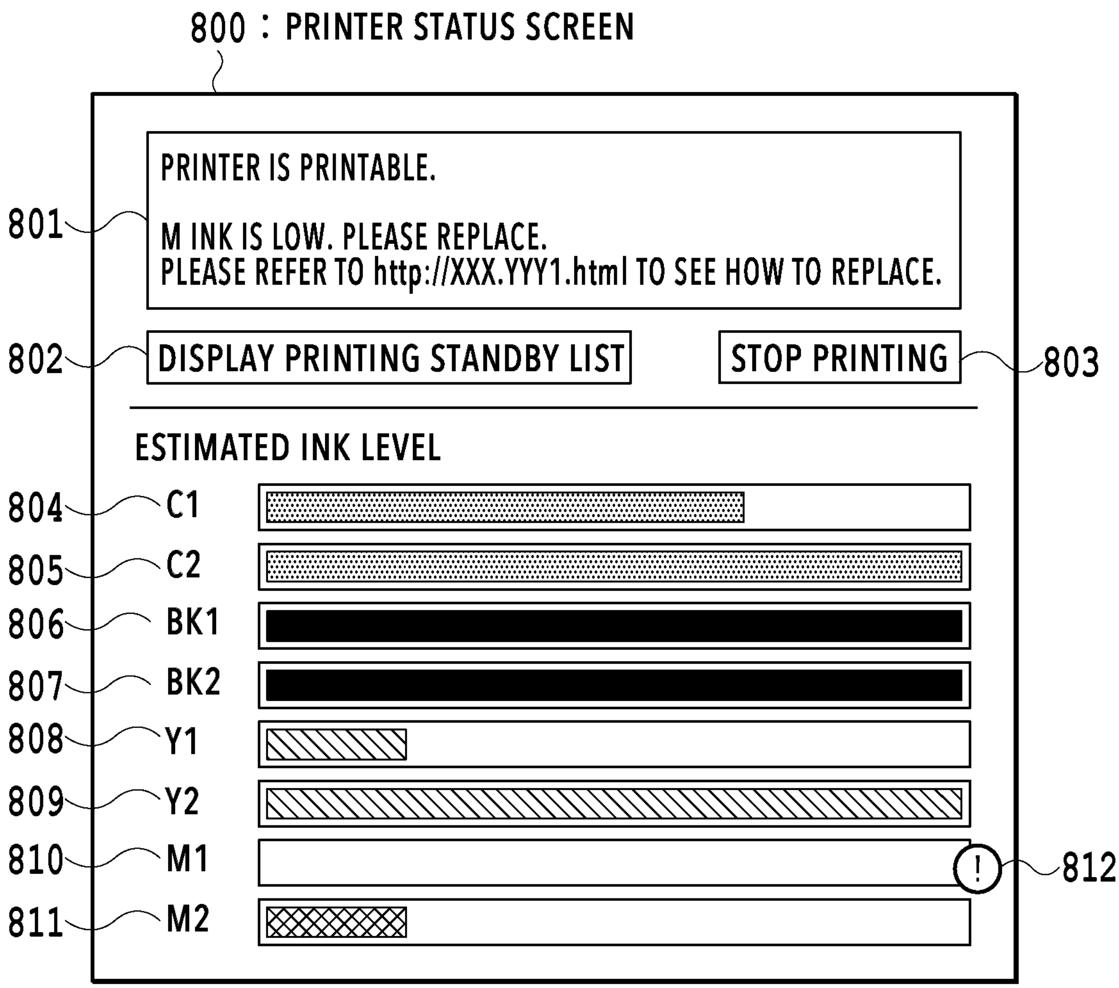
FIG. 8 is an example of a printer status screen displayed by the vendor driver.

FIG. 8 is a diagram illustrating the printer status screen in a case where the pieces of information on the multiple ink tanks displayed by the vendor driver of the terminal apparatus 110 are individually displayed. A display 801 of a printer status screen 800 displays the printer status. In FIG. 8, since "idle" meaning it is printable is received in the status 601 in FIG. 6, "Printer is printable." is displayed on the first line. Additionally, since "warning" indicating that the remaining amount of the ink tank of M (magenta) is received in the combined ink status 623, "M ink is low. Please replace." is displayed on the second line. Additionally, since the information indicating the place of the ink tank to be replaced of the ink tank of M (magenta) is received in the information 626 indicating the place of the ink tank to be replaced, "Please refer to http://XXX.YYY1.html to see how to replace." is displayed on the third line. A button 802 is a button to display a printing standby list. It is possible to refer to a list of the printing jobs that are received by the printing apparatus 120 and are standing by for printing by pressing this button. Additionally, a button 803 is a printing stop button. It is possible to stop a job that is in printing by pressing this button.

Estimated ink levels 804 and 805 display the remaining amounts of the two ink tanks of the C (cyan) ink with bar graphs. As indicated by the ink remaining amount 614, the first ink tank is 70%, and the second ink tank is 100%. Estimated ink levels 806 to 809 display the remaining amounts of the two ink tanks of the BK (black) ink and the two ink tanks of the Y (yellow) ink with bar graphs. Additionally, estimated ink levels 810 and 811 display the remaining amounts of the two ink tanks of the M (magenta) ink with bar graph. As indicated by the ink remaining amount 624, the first ink tank is 0%, and the second ink tank is 30%.

A mark (icon) 812 is displayed to indicate the error since the ink status (625) is "error". With this mark 812 being displayed, it is possible to visually notify the user that M1 ink of the estimated ink level 810 is in the error state, and the replacement is necessary.

Additionally, for example, although the estimated ink levels 804 and 805 are indicated with "C1" and "C2" to clearly show the first and second ink tanks, it is not limited thereto. Both the ink tanks may be indicated with "C" or may be described in another way. Additionally, the same mark or character as that indicated on a mounting portion of the ink tank in the printing apparatus 120 may be applicable.

Figure 9:
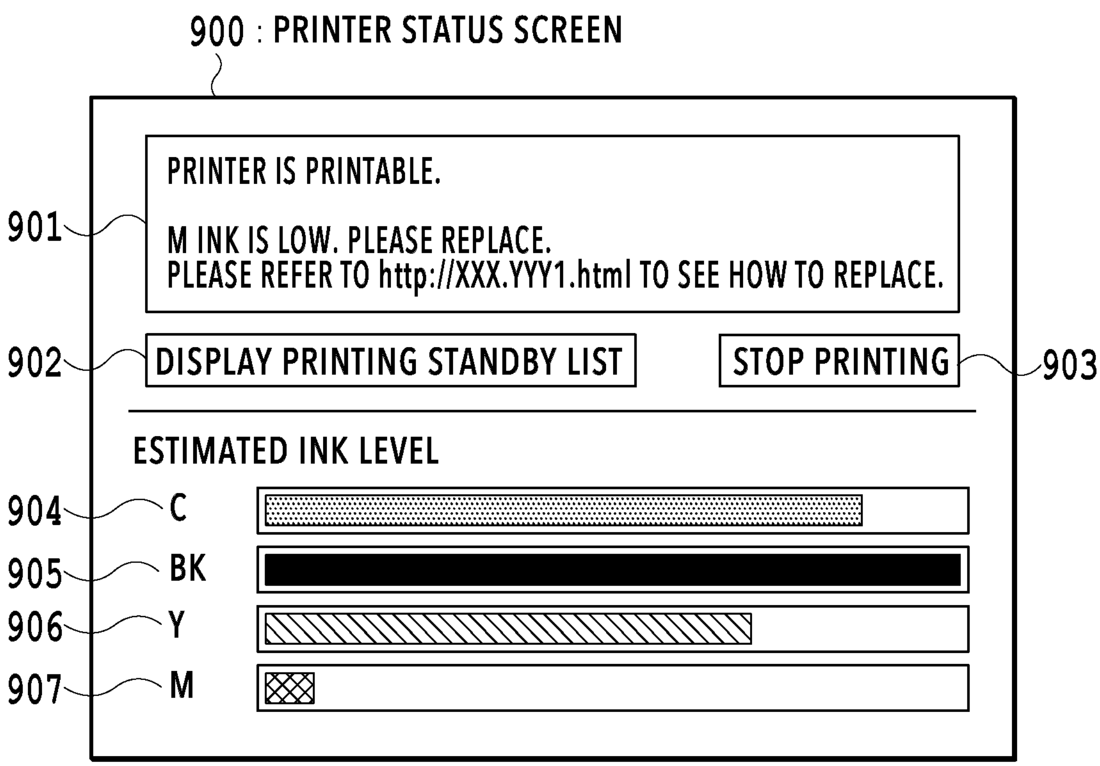
FIG. 9 is an example of the printer status screen displayed by the vendor driver.

FIG. 9 is a diagram illustrating the printer status screen in a case where the pieces of information on the multiple ink tanks displayed by the vendor driver of the terminal apparatus 110 are displayed in the combined form. Since "idle" meaning that it is printable is received in the status 701 as the printer status, a display 901 of a printer status screen 900 displays "Printer is printable." on the first line. Additionally, since "warning" indicating that the remaining amount of the ink tank of M (magenta) is received in the ink status 721, "M ink is low. Please replace." is displayed on the second line. Moreover, since the information indicating the place of the ink tank to be replaced of the ink tank of M (magenta) in the information 723 indicating the place of the ink tank to be replaced, "Please refer to http://XXX.YYY1.html to see how to replace." is displayed on the third line. Buttons 902 and 903 are similar to the buttons 802 and 803; for this reason, descriptions are omitted. An estimated ink level 904 displays an average value of the remaining amounts of the two ink tanks of the C (cyan) ink received in the ink remaining amount 712 with a bar graph. As indicated by the ink remaining amount 712, the estimated ink level 904 is 85%. Estimated ink levels 905 and 906 each display an average value of the remaining amounts of the two ink tanks of the BK (black) ink and that of the two ink tanks of the Y (yellow) ink, which are omitted in FIG. 7, with bar graphs. Additionally, an estimated ink level 907 displays an average value of the remaining amounts of the two ink tanks of the M (magenta) ink with a bar graph. As indicated by the ink remaining amount 722, the estimated ink level 907 is 15%.

Thus, the eight remaining amounts of the ink tanks are displayed in FIG. 8, and the four remaining amounts of the ink tanks are displayed in FIG. 9. Therefore, in the display regions of the ink remaining amounts in FIGS. 8 and 9, a much wider display region is needed in a case of displaying the information on the multiple ink tanks in FIG. 8. To deal with this, as described with reference to FIG. 4, the terminal apparatus 110 can designate whether to display the ink tank information in the "individual" form or the "combined" form depending on the size of the display region on the driver.

As described above, according to the present embodiment, it is possible to generate the status favorably. Specifically, in the printing apparatus in which multiple ink tanks of the same color type are mounted, the information on the multiple ink tanks of the same color type is generated in either of the "individual" form and the "combined" form depending on the designation from the terminal apparatus side, the driver type, and the state of the ink tank, and the generated information is responded to the terminal apparatus.

With this, for example, in a case where the terminal apparatus uses the vendor driver, it is possible to individually display the information on each of the multiple ink tanks of the same color type. Additionally, in a case where the terminal apparatus uses the OS default driver, it is possible to display the information on the multiple ink tanks in the combined form by the same color type.

Additionally, depending on whether the request designates "individual" or "combined" from the terminal apparatus, it is possible to respond the multiple pieces of information on the ink tanks by the same color type or to respond the multiple pieces of information on the ink tanks in the combined form by the same color type.

Moreover, depending on whether it is a state in which the ink tank of the printing apparatus needs to be replaced, it is possible to respond the multiple pieces of information on the ink tanks by the same color type or to respond the multiple pieces of information on the ink tanks in the combined form by the same color type.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-029234, filed Feb. 28, 2023, which is hereby incorporated by reference herein in its entirety.

What is claimed is:

1. A printing apparatus including a container that includes a plurality of containers containing printing materials of the same color type, comprising:

an obtainment unit that obtains a request of information related to a state of the printing apparatus; and a transmission unit that transmits the information related to a state of the printing apparatus including first information related to a combined amount of the printing materials included in the plurality of containers containing the printing materials of the same color type, respectively, based on the request obtained by the obtainment unit.

2. The printing apparatus according to claim 1, wherein the transmission unit transmits the first information to an information processing apparatus communicable with the printing apparatus.

3. The printing apparatus according to claim 2, wherein based on the request, the transmission unit transmits information including second information that is information related to an amount of the plurality of containers containing the printing materials of the same color type and is individual information related to an amount of the printing material for each of the plurality of containers.

4. The printing apparatus according to claim 3, wherein in a case where the information related to a state of the printing apparatus is generated, based on the request, the printing apparatus transmits either information of the first information and the second information.

5. The printing apparatus according to claim 3, wherein in a case where the request obtained by the obtainment unit includes information indicating that the information related to the amount of the containers is generated in a combined form by the same color type, the first information is transmitted.

6. The printing apparatus according to claim 3, wherein in a case where the request obtained by the obtainment unit includes information indicating that the information related to the amount of the containers is generated in an individual form by the same color type, the second information is transmitted.

7. The printing apparatus according to claim 3, wherein the printing apparatus transmits either information of the first information and the second information depending on a type of a driver included in the information processing apparatus that transmits the request.

8. The printing apparatus according to claim 7, wherein in a case where the driver included in the information processing apparatus is an OS default driver, the first information is transmitted.

9. The printing apparatus according to claim 7, wherein in a case where the driver included in the information processing apparatus is a vendor driver corresponding to the printing apparatus, the second information is transmitted.

10. The printing apparatus according to claim 3, wherein the printing apparatus transmits either information of the first information and the second information based on a remaining amount of the printing material in the container.

11. The printing apparatus according to claim 10, wherein in a case where the remaining amount of the printing material exceeds a predetermined threshold, the first information is transmitted.

12. The printing apparatus according to claim 10, wherein in a case where the remaining amount of the printing material is equal to or smaller than a predetermined threshold, the second information is transmitted.

13. The printing apparatus according to claim 1, wherein the transmission unit further transmits information indicating whether the printing apparatus is printable or in an error state.

14. The printing apparatus according to claim 1, wherein the printing material is ink, and the container is an ink tank.

15. A method of controlling a printing apparatus including a container including a plurality of containers containing printing materials of the same color type, comprising:

obtaining a request of information related to a state of the printing apparatus; and transmitting the information related to a state of the printing apparatus including first information related to a combined amount of the printing materials included in the plurality of containers containing the printing materials of the same color type, respectively, based on the request obtained in the obtaining.

16. A non-transitory computer readable storage medium storing a program which functions in a printing apparatus and causes a computer of the printing apparatus including a container including a plurality of containers containing printing materials of the same color type to execute:

obtaining a request of information related to a state of the printing apparatus; and transmitting the information related to a state of the printing apparatus including first information related to a combined amount of the printing materials included in the plurality of containers containing the printing materials of the same color type, respectively, based on the request obtained in the obtaining.

* * * * *